United States Patent
Lee et al.

(10) Patent No.: US 8,954,391 B2
(45) Date of Patent: Feb. 10, 2015

(54) SYSTEM AND METHOD FOR SUPPORTING TRANSIENT PARTITION CONSISTENCY IN A DISTRIBUTED DATA GRID

(71) Applicant: Oracle International Corporation, Redwood Shores, CA (US)

(72) Inventors: Robert H. Lee, San Carlos, CA (US); Gene Gleyzer, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/671,408

(22) Filed: Nov. 7, 2012

(65) Prior Publication Data
US 2014/0108358 A1    Apr. 17, 2014

Related U.S. Application Data

(60) Provisional application No. 61/714,100, filed on Oct. 15, 2012.

(51) Int. Cl.
| G06F 17/30 | (2006.01) |
| H04L 12/26 | (2006.01) |
| G06F 9/50 | (2006.01) |
| H04L 12/24 | (2006.01) |

(52) U.S. Cl.
CPC ...... *H04L 43/0811* (2013.01); *G06F 17/30067* (2013.01); *G06F 9/5072* (2013.01); *H04L 41/0668* (2013.01)
USPC ........................................................ 707/642

(58) Field of Classification Search
CPC .......................... G06F 11/1458; G06F 2201/82
USPC ............................................................ 707/642
See application file for complete search history.

(56) References Cited

U.S. PATENT DOCUMENTS

| 5,014,265 | A | 5/1991 | Hahne et al. |
| 5,301,350 | A | 4/1994 | Rogan et al. |
| 5,784,698 | A | 7/1998 | Brady et al. |
| 6,070,202 | A | 5/2000 | Minkoff et al. |
| 6,338,112 | B1 | 1/2002 | Wipfel et al. |
| 6,826,597 | B1 | 11/2004 | Lonnroth et al. |
| 7,058,055 | B2 | 6/2006 | Mugica |
| 7,139,925 | B2 | 11/2006 | Dinker |
| 7,707,513 | B2 | 4/2010 | Broda |
| 7,861,249 | B2 | 12/2010 | Jiang |
| 8,024,445 | B2 | 9/2011 | Kamijima |
| 8,131,894 | B2 | 3/2012 | Cain et al. |

(Continued)

OTHER PUBLICATIONS

Tanenbaum, Andrew S., "*Modern operating systems*" Prentice-Hall, Inc., Upper Saddle River, New Jersey, 2001. 5 pages.

(Continued)

*Primary Examiner* — Baoquoc N To
(74) *Attorney, Agent, or Firm* — Meyer IP Law Group (57) ABSTRACT

A system and method can support transient partition consistency in a distributed data grid. A cluster node in the distributed data grid can maintain a storage data structure and an index data structure. The storage data structure can store data in one or more partitions maintained on the cluster node, and the index data structure contains a plurality of indexes, wherein each index supports indexing at least one data grid operation on the one or more partitions. Furthermore, the distributed data grid ensures consistency between the storage data structure and the index data structure for the data stored in the one or more partitions maintained on the cluster node.

18 Claims, 5 Drawing Sheets

(56) References Cited

U.S. PATENT DOCUMENTS

| | | |
|---|---|---|
| 8,249,072 B2 | 8/2012 | Sugumar |
| 8,271,980 B2 | 9/2012 | Jackson |
| 8,290,919 B1 | 10/2012 | Kelly |
| 8,392,368 B1 | 3/2013 | Kelly |
| 8,612,386 B2 | 12/2013 | Tien |
| 8,768,981 B1 | 7/2014 | Milne |
| 2004/0010674 A1 | 1/2004 | Boyd |
| 2004/0083317 A1 | 4/2004 | Dickson et al. |
| 2004/0172618 A1 | 9/2004 | Marvin |
| 2005/0249215 A1 | 11/2005 | Kelsey |
| 2006/0026169 A1 | 2/2006 | Pasqua |
| 2006/0112174 A1 | 5/2006 | L'Heureux et al. |
| 2006/0129516 A1 | 6/2006 | Bradford et al. |
| 2006/0161893 A1 | 7/2006 | Han |
| 2006/0230128 A1 | 10/2006 | Chung |
| 2007/0168336 A1 | 7/2007 | Ransil et al. |
| 2008/0208960 A1 | 8/2008 | Rowley |
| 2009/0077233 A1 | 3/2009 | Kurebayashi |
| 2009/0116484 A1 | 5/2009 | Buford |
| 2010/0005472 A1 | 1/2010 | Krishnaraj |
| 2010/0017461 A1 | 1/2010 | Kokkevis et al. |
| 2010/0037222 A1 | 2/2010 | Tatsubori et al. |
| 2010/0042755 A1 | 2/2010 | Fuente |
| 2010/0060934 A1 | 3/2010 | Bellert |
| 2010/0125624 A1 | 5/2010 | Bachhuber-Haller |
| 2010/0265945 A1 | 10/2010 | Bejerano |
| 2010/0333099 A1 | 12/2010 | Kupferschmidt |
| 2011/0004701 A1 | 1/2011 | Panda |
| 2011/0055322 A1 | 3/2011 | Gregersen |
| 2011/0137991 A1 | 6/2011 | Russell |
| 2011/0225120 A1 | 9/2011 | Cooper |
| 2011/0225121 A1 | 9/2011 | Cooper |
| 2011/0225122 A1 | 9/2011 | Denuit et al. |
| 2012/0113896 A1 | 5/2012 | Karol |
| 2012/0197840 A1 | 8/2012 | Oliver et al. |
| 2012/0197959 A1 | 8/2012 | Oliver et al. |
| 2012/0198455 A1 | 8/2012 | Lee et al. |
| 2012/0278398 A1 | 11/2012 | Lowekamp |
| 2012/0331029 A1 | 12/2012 | King, III et al. |
| 2013/0014114 A1 | 1/2013 | Nagata |
| 2013/0073809 A1* | 3/2013 | Antani et al. ............... 711/136 |
| 2013/0074101 A1 | 3/2013 | Oliver |
| 2013/0128726 A1 | 5/2013 | Hellhake |
| 2013/0262632 A1 | 10/2013 | Fein |
| 2013/0325543 A1 | 12/2013 | Magee |
| 2014/0016457 A1 | 1/2014 | Enyedi |
| 2014/0219209 A1 | 8/2014 | Soneda |

OTHER PUBLICATIONS

Tanenbaum, Computer Networks, Fourth Edition, Chapter 5: 5.2.7 Broadcast Routing, 2003, 3 pages, Prentice Hall PTR, Upper Saddle River, New Jersey.

* cited by examiner

SYSTEM AND METHOD FOR SUPPORTING TRANSIENT PARTITION CONSISTENCY IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by Lee, et al., filed Oct. 15, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application Ser. No. 13/671,369, titled "SYSTEM AND METHOD FOR PROVIDING SUPPORTING GUARANTEED MULTI-POINT DELIVERY IN A DISTRIBUTED DATA GRID", by Lee, et al., filed Nov. 7, 2012.

U.S. patent application Ser. No. 13/671,376, titled "SYSTEM AND METHOD FOR PROVIDING PARTITION PERSISTENT STATE CONSISTENCY IN A DISTRIBUTED DATA GRID", by Lee, et al., filed Nov. 7, 2012.

U.S. patent application Ser. No. 13/671,395, titled "SYSTEM AND METHOD FOR SUPPORTING ASYNCHRONOUS MESSAGE PROCESSING IN A DISTRIBUTED DATA GRID", filed Nov. 7, 2012.

U.S. patent application Ser. No. 13/671,481, titled "SYSTEM AND METHOD FOR SUPPORTING OUT-OF-ORDER MESSAGE PROCESSING IN A DISTRIBUTED DATA GRID", by Falco, et al., filed Nov. 7, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support transient partition consistency in a distributed data grid. A cluster node in the distributed data grid can maintain a storage data structure and an index data structure. The storage data structure can store data in one or more partitions maintained on the cluster node, and the index data structure contains a plurality of indexes, wherein each index supports indexing at least one data grid operation on the one or more partitions. Furthermore, the distributed data grid ensures consistency between the storage data structure and the index data structure for the data stored in the one or more partitions maintained on the cluster node

DETAILED DESCRIPTION

Described herein is a system and method that can support transient partition consistency in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
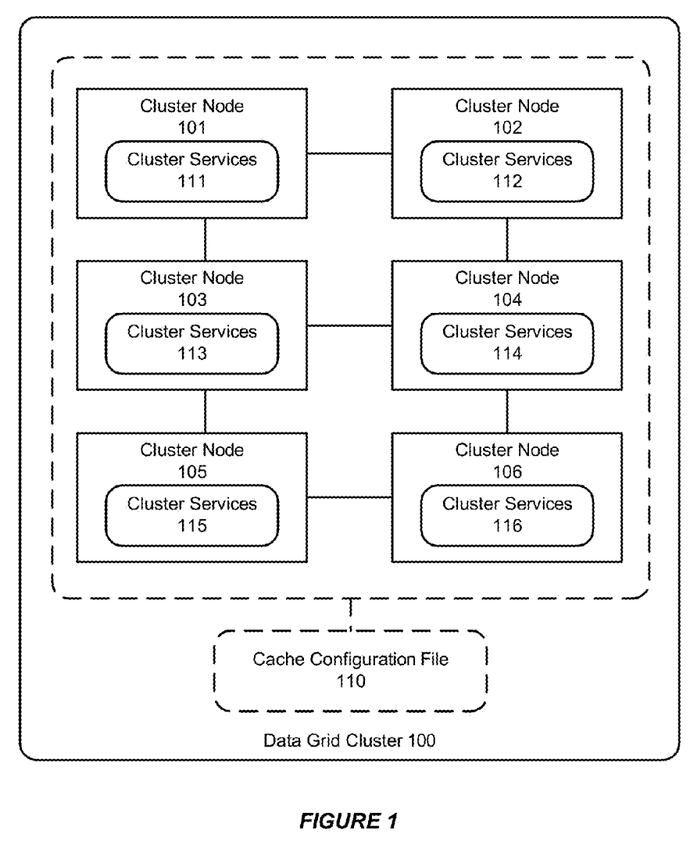
FIG. 1 is an illustration of a data grid cluster in accordance with various embodiments of the invention.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Backing Map and Index

Figure 2:
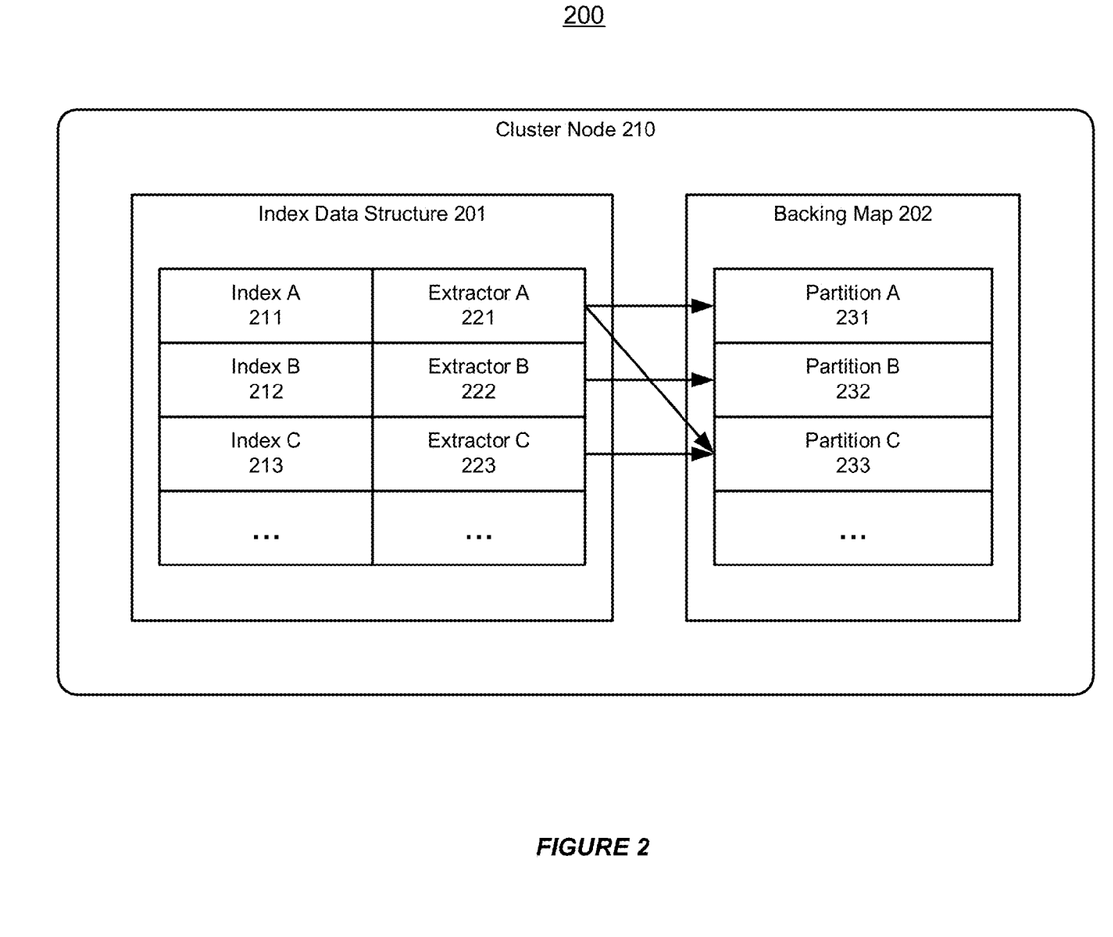
FIG. 2 shows an illustration of supporting indexing a backing map in a distributed data grid in accordance with an embodiment of the invention.

FIG. 2 shows an illustration of supporting indexing a backing map in a distributed data grid in accordance with an embodiment of the invention. As shown in FIG. 2, a cluster node 210 in the distributed data grid 200, which can be a named cache backend in an Oracle Coherence data grid, can maintain a storage data structure, e.g. a backing map 202, and an index data structure 201.

The backing map 202 can store data for a cahce in different partitions, e.g. partition A-C 231-233, in a named cache running on the distributed data grid 200. Additionally, the backing map 202 can support various data grid operations, e.g. a query operation, on data stored in the cache. Such data grid operations can be expensive since they may require the cluster node 210 to perform serialization and/or deserialization of various software objects.

The index data structure 201 can improve the performance of various data grid operations, such as query and aggregation operations, on the plurality of partitions A-C 231-233 in the storage data structure 200. Furthermore, the index data structure 201 can maintain one or more indexes, e.g. indexes A-C 211-213, each of which can be based on one or more extractors, e.g. extractors A-C 221-223.

In the example of Coherence, the indexes in the index data structure 201 can be query indexes that allow values (or attributes of the values) and corresponding keys to be correlated within a QueryMap to increase query performance. The QueryMap class can provide an addIndex method to create indexes as in the following.

addIndex (ValueExtractor extractor, boolean fOrdered, Comparator cmparator)

As shown in the above, a valueExtractor can be used to extract an attribute from a given object for querying, or indexing, and the addIndex method can index any attribute that can be queried.

Furthermore, an IndexMap can be used to implement the index data structure 201. The IndexMap is a map of indexes maintained by the storage cluster node 210. The keys of the IndexMap can be ValueExtractor objects, and for each key, the corresponding value stored in the IndexMap can be a MapIndex object.

In accordance with an embodiment of the invention, the data grid operation can be performed based on at least one of a filter and an aggregator. For example, a filter can have a single method which determines whether a given object meets a criterion, and an aggregator can process multiple entries in the cache to achieve a result.

Transient Partition Consistency

In accordance with an embodiment of the invention, transient partition consistency can be supported in the distributed data grid to ensure index consistency and allow concurrency control.

Figure 3:
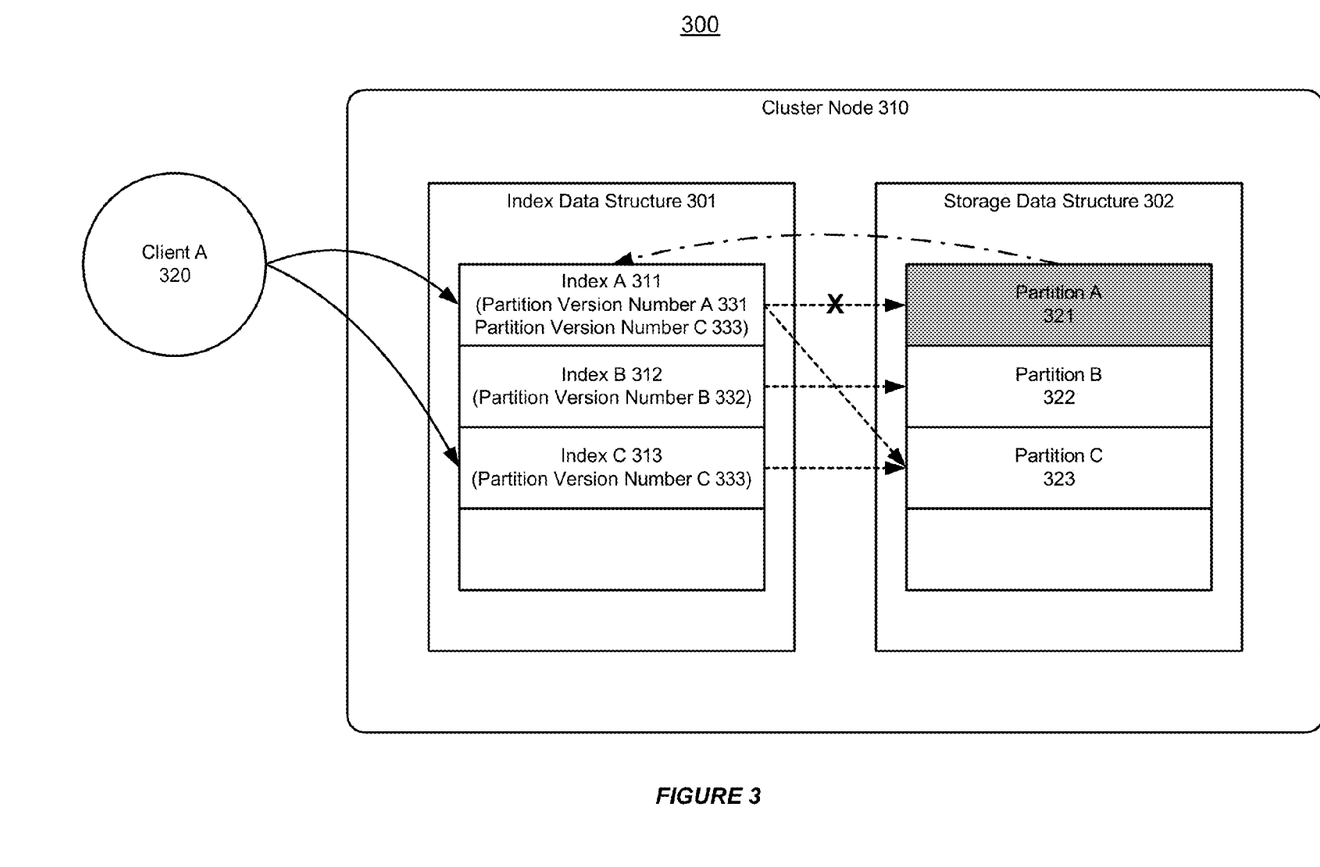
FIG. 3 shows an illustration of supporting index consistency in a distributed data grid in accordance with an embodiment of the invention.

FIG. 3 shows an illustration of supporting index consistency in a distributed data grid in accordance with an embodiment of the invention. As shown in FIG. 3, a cluster node 310 in the distributed data grid 300 can maintain a storage data structure 302, e.g. a backing map in an Oracle Coherence data grid, and an index data structure 301. The storage data structure can hold data for one or more partitions maintained on the cluster node 301, e.g. partitions A-C 321-323. The index data structure 301 can increase the performance of one or more data grid operations, such as query and aggregation operations.

The distributed data grid 301 can ensure the consistency between the index data structure 301 and the storage data structure 302 for data stored in the plurality of partitions A-C 321-323 on the cluster node 310.

As shown in FIG. 3, the cluster node 310 can use the indexes A-C 311-313 in the index data structure 301 to increase the performance of various data grid operations. The cluster node 310 can determine whether the indexes in the index data structure 301 are consistent with the partitions A-C 321-323 in the storage data structure 302 for the cache.

In accordance with an embodiment of the invention, the cluster node 310 can determine whether the indexes in the index data structure 301 are consistent with the partitions A-C 321-323 in the storage data structure 302 based on checking the partition version numbers A-C 331-333. The partition version numbers A-C 331-333 can provide transient state information of each partition A-C 321-323 in the storage data structure 302.

Each partition version number A-C 331-333 can be used to indicate a transient partition version that is associated with an index A-C 311-313 in the index data structure 301. For example, the index A 311 is based on the partition version number A 331 and the partition version number C 333, while the index B 312 is based on the partition version number B 332 and the index C 313 is based on the partition version number C 333.

In the example of Coherence, a storage component that represents a part of a given named cache maintained by the cluster node 310 can provide a CheckIndexConsistency method as following to check whether the index data structure 301 is consistent with the backing map.

CheckIndexConsistency(IndexAwareFilter filter,
    Object[ ] aoResult, int cResults, int nQueryType,
    PartitionSet partMask, long lIdxVersion)

As shown in the above, the filter parameter can be used to obtain the matching keys, and the partMask parameter indicates to which partitionSet that the keys belong. Additionally, the IIdxVersion parameter indicates the version of the indixies assocaited with the partitionSet before the filter was applied. The cluster node 310 can compare the IldxVersion with a StorageVersion, which indicates the current versions of the backing map.

The cluster node 310 can determine whether the backing map has changed while populating the query result with the values, in order to prevent invalid results from being added after the keys were matched by the index. If the backing map has changed, the values that are suspect can be rechecked, and a value can be removed from the query result if it no longer matches.

In the example as shown in FIG. 3, the partition A 321 in the storage data structure 302 is updated, which renders the index A 311 in the index data structure 301 obsolete (as illustradted using a bold "X" symbol on the dotted line).

When the cluster node 310 receives a request from a client 320, such as a request for querying the data in the partition A 321, the cluster node 310 can perform the query operation on the partition A 321 in order to obtain the updated information. Then, the cluster node 310 can update the index A 311 in the index data structure 301 accordingly to the updated information.

Additionally, the client A 320 may request a query on the data in the storage data structure 302 involving multiple indexes in the index data structure 301. For example, the request from the client A 320 can involve another index, e.g. an index C 313, which is associated with the partition C 323 that is not updated. The cluster node 310 can prepare a response to the Client A 320 based on the index C 313, without a need to perform the query operation on the partition C 323 again in order to increase the query performance.

Thus, by ensuring the consistency between the index data structure 301 and the storage data structure 302 for data stored in the plurality of partitions A-C 321-323 on the cluster node 310, the distributed data grid 300 can achieve high performance for various data grid operations.

Figure 4:
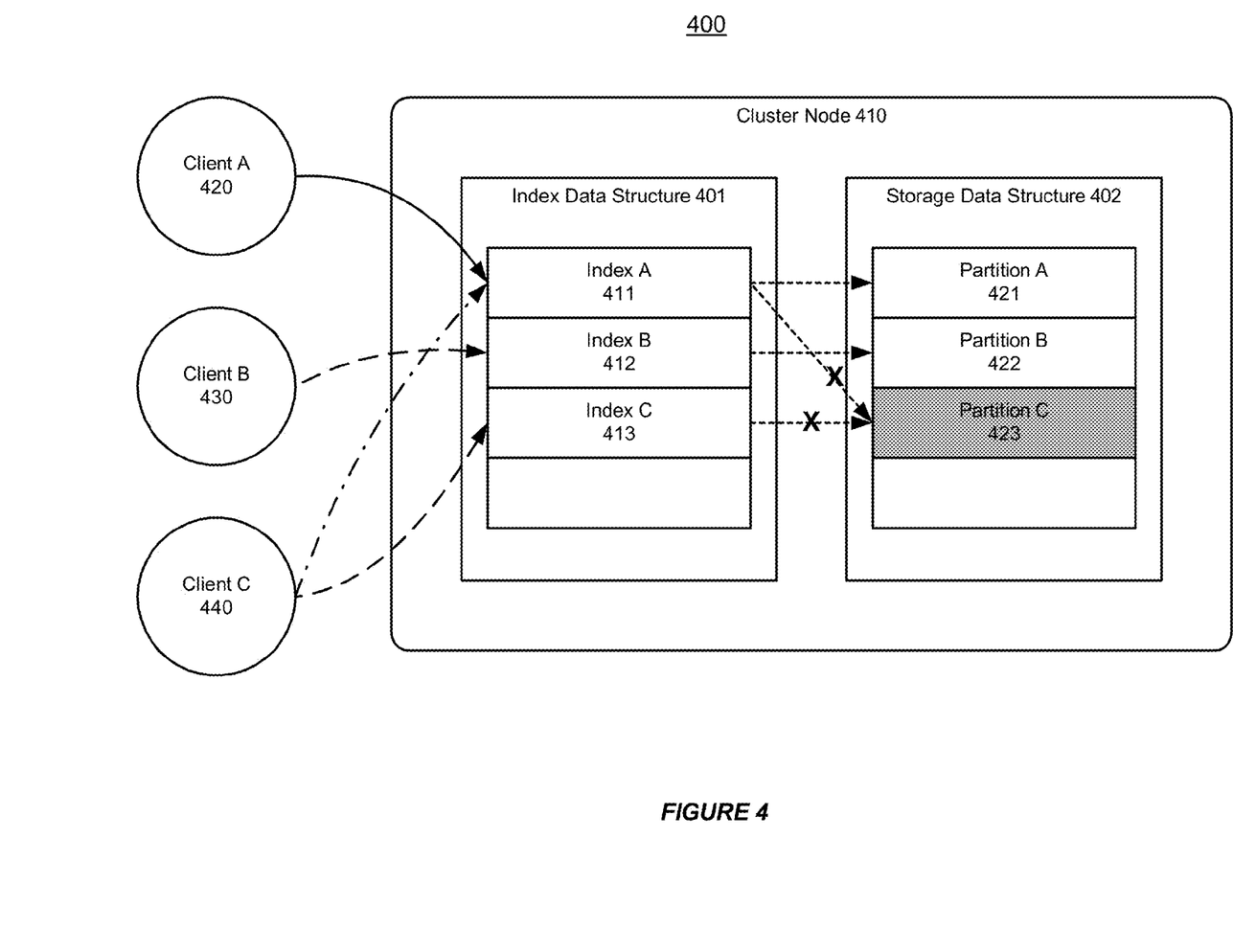
FIG. 4 shows an illustration of supporting concurrency control in a distributed data grid in accordance with an embodiment of the invention.

FIG. 4 shows an illustration of supporting concurrency control in a distributed data grid in accordance with an embodiment of the invention. As shown in FIG. 4, a cluster node 410 in the distributed data grid 400 can maintain a storage data structure 402 and an index data structure 401. The storage data structure 402 can hold data for one or more partitions, e.g. partition A-C 421-423, maintained on the cluster node 410. Here, the data in the partition C 413 is updated, which renders the index A 411 and index C 413 obsolete (as illustradted using bold "X" symbols on the dotted lines).

The cluster node 410 can receive a query request from the client A 420 for the data in the partition A 421 in the cache. The query request can be based on the index A 411. Thus, the cluster node 410 can determine that the index A 411 is not consistent with the data in the partition C 423 in the storage data structure 402, and proceed to update the index A 411 in the index data structure 401 by performing the query on the data in partition C 423.

In the meantime, the cluster node can receive another request from the Client B 430 for querying the data in the partition B 422 in the cache using the index B 412. The cluster node 410 can process the query request from the Client B 430 before the cluster node finishes updating the index data structure for a partition, since the index B 412 is up-to-date. On the other hand, when the cluster node receives a request from the Client C 440 for querying the data in the partition C 423 in the cache using the index C 413, the cluster node 410 may need to update the index C 413 in the index data structure 401 by performing the query on the data in partition C 423.

In another example, the cluster node 410 can receive a request from the client C 440 for querying the data in both the partition A 421 and the partition C 423 in the cache using the index A 411. The cluster node 410 can block the query request from Client C 440, before the cluster node 410 finishes updating the index A 411 and index C 413 in the index data structure 401, in order to prevent inconsistency.

Figure 5:
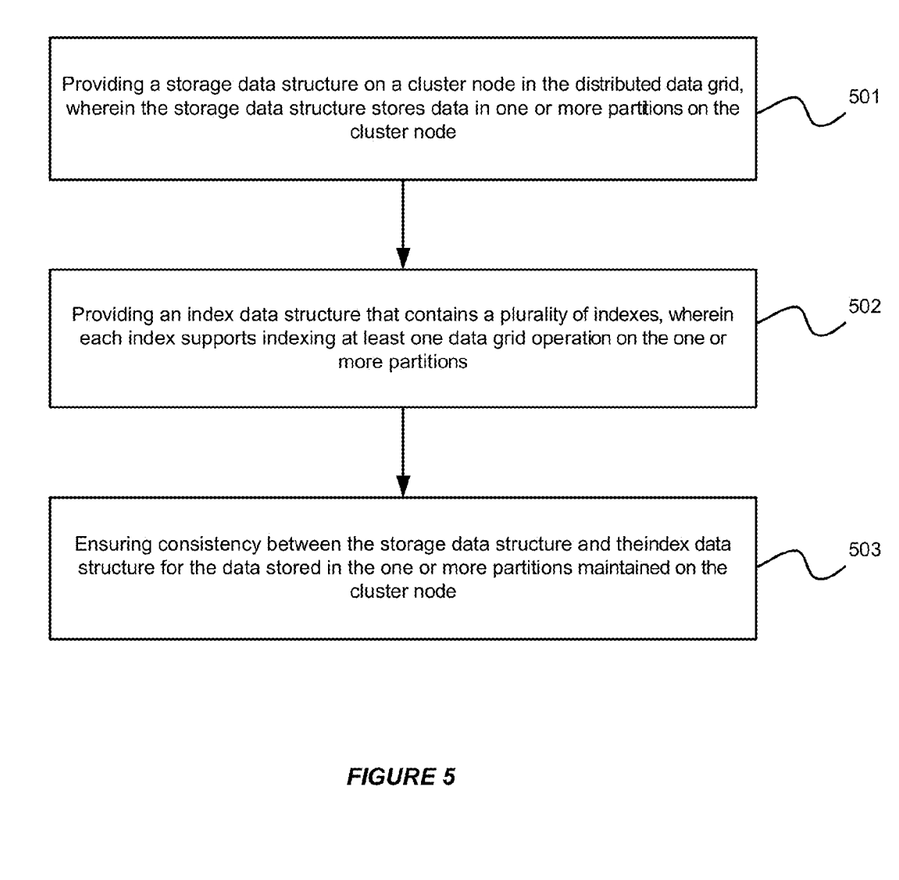
FIG. 5 illustrates an exemplary flow chart for supporting transient partition consistency in a distributed data grid in accordance with an embodiment of the invention.

FIG. 5 illustrates an exemplary flow chart for supporting transient partition consistency in a distributed data grid in accordance with an embodiment of the invention. As shown in FIG. 5, at step 501, the distributed data grid can provide a storage data structure on a cluster node in the distributed data grid, wherein the storage data structure stores data in one or more partitions on the cluster node. Furthermore, at step 502, the distributed data grid can provide can provide an index data structure that contains a plurality of indexes, wherein each index supports indexing at least one data grid operation on the one or more partitions. Then, at step 503, the distributed data grid can ensure consistency between the storage data structure and the index data structure for the data stored in the one or more partitions maintained on the cluster node.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting transient partition consistency in a distributed data grid, comprising:
   a storage data structure on a cluster node in the distributed data grid, wherein the storage data structure stores data in one or more partitions on the cluster node; and
   an index data structure for the data stored in the one or more partitions, wherein the index data structure contains a plurality of indexes, wherein each index supports at least one data grid operation on the one or more partitions;
   wherein the distributed data grid operates to determine whether an index in the index data structure is consistent with the one or more partitions by checking a partition version number of each said partition; and
update the index in the index data structure to maintain consistency between the index data structure and the storage data structure to support the at least one data grid operation on the one or more partitions.

2. The system according to claim 1, wherein the storage data structure is a backing map that stores data for a cache running on the distributed data grid.

3. The system according to claim 1, wherein the at least one data grid operation uses at least one of a filter and an aggregator.

4. The system according to claim 1, wherein each index is associated with an extractor that operates to perform the at least one data grid operation.

5. The system according to claim 1, wherein each index is associated with one or more partition version numbers, wherein each partition version number provides transient state information of a partition in the storage data structure.

6. The system according to claim 1, wherein the cluster node operates to receive a first request from a client for querying the data in the one or more partitions in the storage data structure based on at least one index.

7. The system according to claim 1, wherein the cluster node operates to query the data in the one or more partitions in the storage data structure before updating the index data structure.

8. The system according to claim 1, wherein the cluster node operates to process a second request from a client for querying the data in the one or more partitions before the cluster node finishes updating the index in the index data structure, if the second request does not use the index.

9. The system according to claim 1, wherein the cluster node operates to block a second request from a client for querying the data in the one or more partitions before the cluster node finishes updating the index in the index data structure, if the second request uses the index.

10. A method for supporting transient partition consistency in a distributed data grid, comprising:
providing a storage data structure on a cluster node in the distributed data grid, wherein the storage data structure stores data in one or more partitions on the cluster node;
providing an index data structure for the data stored in the one or more partitions, wherein the index data structure contains a plurality of indexes, wherein each index supports at least one data grid operation on the one or more partitions;
determining whether an index in the index data structure is consistent with for the one or more partitions by checking a partition version number of each said partition; and
updating the index in the index data structure to maintain consistency between the index data structure and the storage data structure to support the at least one data grid operation on the one or more partitions.

11. The method according to claim 10, wherein the storage data structure is a backing map that stores data for a cache running on the distributed data grid.

12. The method according to claim 10, wherein the at least one data grid operation uses at least one of a filter and an aggregator.

13. The method according to claim 10, wherein each index is associated with an extractor that operates to perform the at least one data grid operation.

14. The method according to claim 10, wherein each index is associated with one or more partition version numbers, wherein each partition version number provides transient state information of a partition in the storage data structure.

15. The method according to claim 10, wherein the cluster node receives a first request from a client for querying the data in the one or more partitions in the storage data structure based on at least one index.

16. The method according to claim 10, wherein the cluster node operates to query the data in the one or more partitions in the storage data structure before updating the index data structure.

17. The method according to claim 10, wherein after the cluster node receives a second request from a client for querying the data in the one or more partitions and before the cluster node finishes updating the index in the index data structure, the cluster node operates to process the second request, if the second request does not use the at least one index, or block the second request, if the second request uses the index.

18. A non-transitory machine readable storage medium having instructions stored thereon that when executed cause a system to perform the steps comprising:
providing a storage data structure on a cluster node in the distributed data grid, wherein the storage data structure stores data in one or more partitions on the cluster node;
providing an index data structure for the data stored in the one or more partitions, wherein the index data structure contains a plurality of indexes, wherein each index supports at least one data grid operation on the one or more partitions;
determining whether an index in the index data structure is consistent with the one or more partitions by checking a partition version number of each said partition; and
updating the index in the index data structure to maintain consistency between the index data structure and the storage data structure to support the at least one data grid operation on the one or more partitions.

* * * * *

UNITED STATES PATENT AND TRADEMARK OFFICE
CERTIFICATE OF CORRECTION

| | |
|---|---|
| PATENT NO. | : 8,954,391 B2 |
| APPLICATION NO. | : 13/671408 |
| DATED | : February 10, 2015 |
| INVENTOR(S) | : Robert H. Lee et al. |

It is certified that error appears in the above-identified patent and that said Letters Patent is hereby corrected as shown below:

In the drawings

Sheet 5 of 5, figure 5, Reference Numeral 501, line 2, delete "parttions" and insert -- partitions --, therefor.

In the specification

Column 1, line 39, before "filed" insert -- by Gleyzer --.

Column 1, lines 45-53, delete "COPYRIGHT NOTICE A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever."

Column 3, line 44, delete "cahce" and insert -- cache --, therefor.

Column 5, lines 4-5, delete "indixies assocaited" and insert -- indexes associated --, therefor.

Column 5, line 6, delete "IldxVersion" and insert -- IIdxVersion --, therefor.

Column 5, line 18, delete "illustradted" and insert -- illustrated --, therefor.

Column 5, line 48, delete "413" and insert -- 423 -- therefor.

Column 5, line 50, delete "illustradted" and insert -- illustrated --, therefor.

Signed and Sealed this
Seventh Day of June, 2016

Michelle K. Lee
*Director of the United States Patent and Trademark Office*

CERTIFICATE OF CORRECTION (continued)
U.S. Pat. No. 8,954,391 B2

In the claims

Column 7, line 51, Claim 10, after "with" delete "for".